Figure 1:
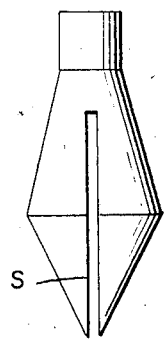

June 23, 1959 W. S. KAO 2,891,339
PROCESS FOR MAKING PHOTOGRAPHIC NEGATIVE RECORDS
AND USING THE SAME FOR THE PRODUCTION
OF THREE DIMENSIONAL IMAGES
Filed Aug. 24, 1953 3 Sheets-Sheet 1

INVENTOR.
Wilson Sam Kao
BY
*Shoemaker & Mattare*
ATTYS

June 23, 1959 W. S. KAO 2,891,339
PROCESS FOR MAKING PHOTOGRAPHIC NEGATIVE RECORDS
AND USING THE SAME FOR THE PRODUCTION
OF THREE DIMENSIONAL IMAGES
Filed Aug. 24, 1953 3 Sheets—Sheet 2
FIG.10
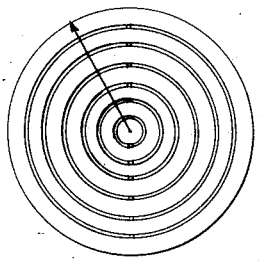
FIG.11
FIG.12
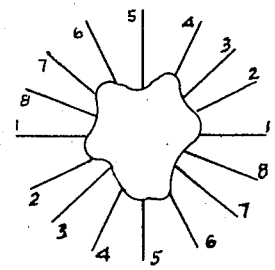
FIG.13
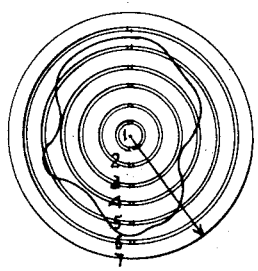
FIG.14
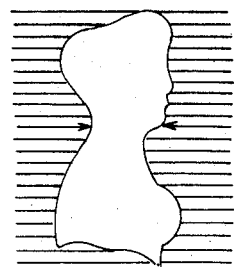
FIG.15
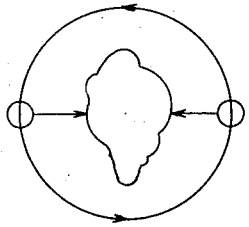
FIG.18
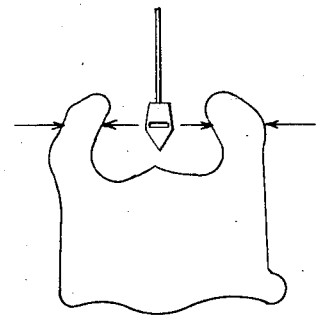
FIG.17
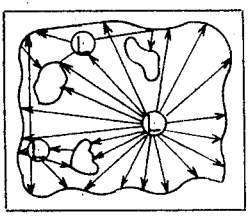
FIG.16
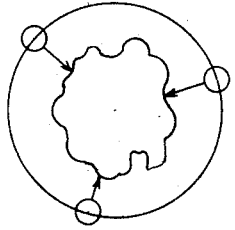
*INVENTOR.*
Wilson Sam Kao
BY
*Shoemaker & Mattare*
ATTYS.

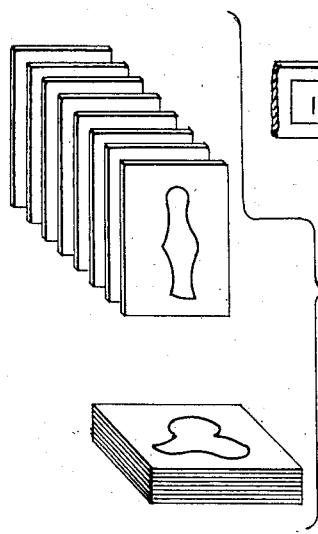
FIG.19
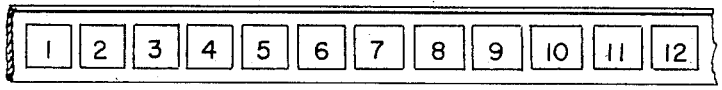
FIG.20
FIG.22
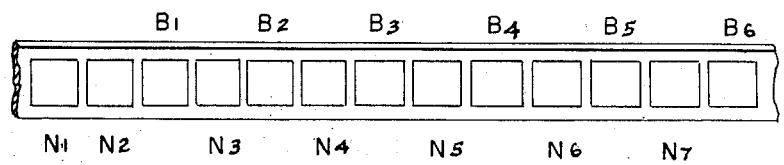
$B_1 = N_1 + N_2$
$B_2 = N_1 + N_2 + N_3$
$B_3 = N_1 + N_2 + N_3 + N_4$
$B_4 = N_1 + N_2 + N_3 + N_4 + N_5$
$B_5 = N_1 + N_2 + N_3 + N_4 + N_5 + N_6$
$B_6 = B_5 + N_7$
$B_7 = \sum (N_1 + N_2 + N_3 + \text{------})$
FIG.21
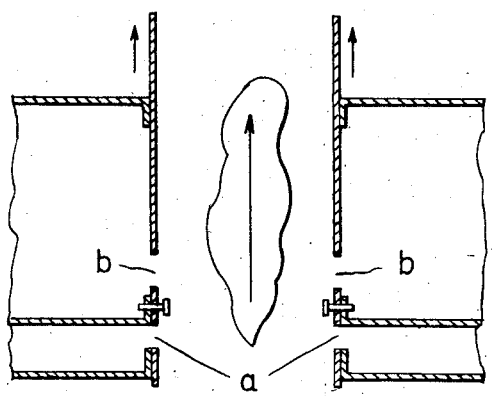
INVENTOR.
Wilson Sam Kao

United States Patent Office 2,891,339
Patented June 23, 1959

2,891,339

PROCESS FOR MAKING PHOTOGRAPHIC NEGATIVE RECORDS AND USING THE SAME FOR THE PRODUCTION OF THREE DIMENSIONAL IMAGES

Wilson S. Kao, Singapore, Straits Settlements

Application August 24, 1953, Serial No. 376,186

Claims priority, application Great Britain September 12, 1952

8 Claims. (Cl. 41—25)

The present invention relates to a new process for taking three-dimensional solid-image or solid-vision photographs and methods of preparing same for viewing, duplicating, projecting, screening, television, transmission or other purposes. My invention has for its main object the formation of a photographic relief image and vision with both body and space similar to the subject in reality, as distinguished from the flat image with mere optical illusion of three dimensions we have seen on the screen or elsewhere.

One object of my invention is to make a photo-sculptural model of a person, an object or a scene so as to exhibit all the contours and dimensions characteristic of the subject. Another object is to create a solid vision with breadth, length and depth in the space or on the screen. A further object is to bring our sense of touch into play and to stimulate our aesthetic desire through both vision and touch. The solid image stands out as a sculptor's work and can be reproduced in any size and quantity by photographic or mechanical means. My invention may also find applications in other fields of interest, such as in casting, moulding, etching, printing, surveying, engineering, metallurgy, cinematography, television, radio transmission of pictures, as well as in radiology, anatomy and scientific studies.

It is well known that a solid or space is made up of an infinite number of slices or planes, each of which has a peculiar shape or form of its own in two photographically accessible dimensions if we imagine them to be detachable. Unfortunately, it is still impossible to subdivide a solid or space into a number of such elementary slices or planes without resort to the use of a knife, so that the camera can be of no avail to the recording of these imaginary slices of a solid.

In the exploitation of this simple geometric conception of a solid or space, it occurs to me that the light beam may be so narrow down to a fractional part of the depth of the solid or space that on being cast on the peripheral surfaces at suitable depth of the solid, a more or less brilliant peripheral band of light will become visible at that depth. This so-called peripheral band of light assumes the form or shape of the imaginary plane cut at that depth of the solid and may be photographically recorded on a plate or film to give a characteristic profile or contour image, which, according to my invention, will be employed as one of the constituent slices or elementary planes of the solid image or solid vision. A number of such profile images have to be recorded along the depth of the solid to be photographed in consecutive order, so that by assembling them we obtain a vivid composite solid image or solid vision with three measurable dimensions. The solid image composed of suitably cut and arranged profile or contour images on any material will then appeal both to the senses of touch and vision without optical or mechanical aid as a photographic sandwich. If the profile images on transparent support are superposed on one another in the right sequence without the unwanted edges being cut off, then the composite image will look like a solid embedded in the transparent support.

In accordance with my invention, it will be necessary to make the exposures in total or partial darkness so that the subject may be narrowly beamed from one end to the other of the depth, without the whole depth of the subject being taken during any one of the serial exposures. Thus, in total or partial darkness, a suitably controlled narrow beam may be directed to the nearest peripheral surfaces of the subject, and the first exposure made to record the first constituent profile image. Next the beam is shifted gradiently towards the farthest peripheral surfaces along the depth of the subject and a series of exposures made to record the second, third, fourth, fifth, . . . and the last constituent profile images on the same plate or a number of plates. In making such serial exposures, either the subject may be allowed to shift past the narrow beam or the beam is allowed to traverse in the direction of the depth. It is important that the serial exposures are made in rapid succession and in synchronisation with the movement of the subject or the narrow beam. A movie camera with all its mechanisms will answer this purpose fairly well.

The light beam may be narrowed down through a small hole or a slot passage if the lamp itself is enclosed in a casing of any suitable form, so that no light is allowed to emit except through the hole or slot. The light beam is more or less conical instead of a straight line, so that when it is intercepted by the peripheral surface along the depth of the subject, the peripheral band of light would exhibit a certain degree of thickness along the depth of the subject. In other words, the depth may be measured in terms of the thickness of the peripheral band of light. As a rule, the smaller the slot passage, the nearer the slot to the peripheral surface, or the farther away the slot from the lamp enclosed in a casing, the thinner will be the band of light. It is also possible to reduce the thickness of the light band to a further extent by inserting a shading slide in the path of the light beam, so as to intercept any unwanted portion of light. The narrow light beamer may be constructed on the principle of a spotlight used in the studio, although it has to be adapted to a different end purpose.

There is no specific range of the narrowness of light beam to give as this varies largely with the size, depth, form and shape of the subject. It may sometimes be necessary to employ two or more narrow beams of different narrowness to render the depth of a given subject more prominently. Thus, where the change in shape along the depth is too abrupt or delicate for a ¼-inch beam, as measured on the peripheral surface hit by the light, to bring out, it may be necessary to reduce the beam to one-eighth, one-tenth, or even one-sixteenth of an inch, with the result that more exposures are required. For a bust study, for instance, the narrow beam which will detail out the contour changes of the nose-mouth outlines of the face may be deemed serviceable, and this beam should be narrower than the lips or eyes as viewed from the side. As long as the beams are narrow enough to subdivide a contour surface of a given depth, so that any abrupt change in shape or form along this depth may be distinguished, they may be employed for the present invention. The term "narrow beam" is used in a relative sense and confined to taking solid photographs in total or partial darkness. It is this narrow beam which enables a short range of the usual "depth of focus" to become visible to the eyes and camera. The depth of a given subject is, therefore, a summation of such narrow-beamed profile images taken along the depth. Each of these profile images, which vary in shape, has the other two dimensions, namely length and breadth, similar to the subject at the depth and covered by the camera or cameras placed at suitable angle with the plane of narrow beams.

In practice, it will be seen that when an object in total or partial darkness is hit by a narrow beam of light emitted through an arch-shaped or circular lamp slot, only that section of the depth of the object which is hit or struck by the beam of light will become visible to the eyes and, consequently, it is possible to record this visible contour surface photographically to form a profile image. If a person is to move slowly across this narrow beam, a series of visible contours of distinct shapes characterising the peripheral surfaces at different depths of the person may be recorded on a reel of film, so exposed that a clear and well-defined profile image of each constituent plane of the depth is obtained. It is, however, permissible in special cases to use alternative narrow and broad beams during the movement of the subject, so that each narrow beam image is followed by a broad beam image, the latter being, in fact, a summation of all previously recorded narrow beam images. The broad beam may be as broad as the depth itself and has the purpose of bridging the narrow beam profiles in such a way as will create a continuous "time lag" and promoting the persistence of vision if the reel of film is to be screened.

In taking studio subjects or spacious scenes, it is merely necessary to direct the narrow beams in such a way that the boundary edges of a given plane of space are hit by the beams and as many boundary contour images of the space may be recorded photographically as required to figure out the depth of the space. Thus, one or more narrow beamers may be employed to emit planes of light beams in the directions of the boundary edges, such as the walls, furnitures, ceilings, floors, or any other solid existences, and preferably in the same depth of the space, as measured from the camera or cameras. From the shapes of the boundary contour images of a given space we can readily take a measure of the area of each plane of space and from the number of contour images recorded in gradient succession it is easy to ascertain the actual depth of the space in question. Group scenes may also be taken on similar arrangements, so that my invention can be conducted both indoors and outdoors.

For bust studies of portrait quality it may be advisable to vary the intensities of narrow beams in such a way that the part of the figure which should appear brighter will be beamed more intensely, while less intense beams will be applied to the shadow part. When the profile images are properly developed and fixed and then assembled to form a solid image, it will acquire the light and tone values by virtue of controlled beamings and exposures.

The camera or cameras used for my invention are preferably of the wide-angle type, especially when larger scenes are to be taken. The camera is usually placed at right angles with the light beams so that each gradient movement of the narrow beamer along the depth is correctly recorded on the plate or film.

In taking three dimensional solid photographs according to my invention it makes no difference whether a subject is beamed from the front to the back, from the top to the bottom, or from one viewpoint to the opposite point, provided the movement of the subject or the narrow beamer is parallel along the depth of one's choice. It is also feasible to rotate the subject or to keep the beamer to revolve around the subject, so that a number of so-called radially beamed profile images may be obtained which have, of course, to be assembled likewise, similar to a wedding cake after cutting into pieces through the center. If a room scene is radially beamed by a narrow beam rotating spirally at sufficient speed, and a camera is held perpendicular to the plane of rotating beams, a number of serial exposures may also be made to record the spiral formation of planes which are practically parallel to one another. Needless to re-emphasize, all exposures have to be made in total or partial darkness in order to obtain as clear an distinct a contour image as possible. No actinic rays other than the narrow beams may be allowed in the place where my invention is being carried out.

In carrying my invention into effect, it is advisable to pose the person, object or scene in such a way that a number of more or less characteristic profile or contour images may be taken with the least of serial exposures. This will require the proper choice of the depth or viewpoint. Thus, if an automobile in partial darkness is to be taken, it is preferable to hold the camera or cameras towards the side of the doors and the narrow beams may then be directed to the head and tail side in gradient succession. When a solid photograph is made up of these constituent profile images, it may be viewed from whatever angle we may select, just as we inspect the car itself in a roundabout manner. When figures come into consideration, it is a good plan to look around the figure carefully in order to make sure that the beams can be successfully applied along the depth. If any part on each plane of beaming happens to be covered or shadowed, so that the profile image is not complete enough, it will be necessary to use a dip-in beamer of sufficiently small size to narrowly beam the covered spot of interest. Such dip-in beamer is usually held in the same plane of beaming as the principal narrow beamers, so as to amend any break of contour in that plane.

All the serial exposures will have to be as short as possible. This will, of course, necessitate the use of large lens apertures, powerful beamers as well as highly sensitive films, so that as short as one-hundredth of a second may be employed with modern outfit and material at our disposal for one single exposure. If one hundred exposures have to be made of a given subject, this will take about one second to finish the job. If the subject measures one foot in depth, then each plane of beaming will occupy only one-hundredth of a foot or 0.12 inch. On being reduced at the ratio of 1:6, for example, the profile image layer with silver halide emulsion would be exactly 0.02 inch or 0.5 millimeter. A composite solid image made up of 100 profile images of such thickness would have a depth of 2 inches. In the usual practice, the requirements are not so strict, although in scientific work more severe requirements may be imposed.

As a relatively large number of exposures have to be made to give a complete range of profile or contour images, it may become necessary to use a number of plates or a long reel of films to record the profile images. However, it is not always necessary to use a fresh plate or film for each exposure if the image is to be copied, reduced or enlarged on photographic papers or similar sensitive materials, because the plate or film may be slided gradiently in one or the other direction so as to record a number of profile images on the same negative, each of which has to be properly registered during the printing or enlargement. Other modes of making a number of exposures on a single photographic plate or film are feasible, such as by the use of lenticular plate in the new technique of multiple-frame photography, fresh coating of a sensitive layer for each individual exposure, and the like.

It will be understood that the narrow beams are not confined to visible light beams, but also include any invisible rays of photoactinic value, such as ultra-violet rays, infra-red rays, X-rays, gamma rays, and the like. All such rays may be suitably controlled to emit narrow beams for a given purpose. Thus, the X-rays may be brought down to a predetermined narrowness so as to beam at a given depth of the body, and then it is comparatively easy to take the narrow beam image of that depth, much in the same way as the light beams in the darkness may be photographically recorded.

Having taken a series of contour or profile images in accordance with my invention, it is easy to assemble or screen them to produce solid image or solid vision in negative or positive if the order of assembling, printing, enlarging, projecting, or screening them is carefully followed. It often occurs that some apparently undesirable images are more or less faintly developed out with the contours and profiles, such as the nearby planes of a certain depth under beaming as a result of insufficient darkness or the use of a broader beam, but if the contours and profiles are superposed or screened, such defect is tolerable. However, every care must be taken to keep the subject standstill for the duration of serial exposures, or the solid image or vision would be blurred or distorted.

When moving subjects come into consideration, it will be necessary to ascertain the shutter speed required to arrest the motion as in taking sports, motion or smiling pictures, and the serial exposures of a given posing at rest have to be made in good time so that the estimated number of contour images at one fraction of the shutter speed will be recorded on the plate without distortion. Thus, if a shutter speed of, say, one fiftieth of a second is called for and twenty profile images or serial exposures are contemplated of a given posing of a person, object or scene at the moment of rest, then each exposure should be about one-thousandth of a second or less. A complete series of exposures for this posing would then take one fiftieth of a second.

Once the viewpoint is chosen, the depth must be surveyed in order to ascertain the thickness of the narrow beams and the number of serial exposures required to obtain a suitable formation of contour images. It may be a good practice to employ narrow beams of different thickness to render the contours along the depth as naturally as possible. As matter of fact, each kind of subject has to be studied before a choice is made. Sometimes, parallel beamings are recommended to make a composite solid image or solid vision in the form of a photographic sandwich. At other times, radial or diagonal beamings have to be adopted in order to render wave-like contour surfaces more accessible to the lens, in which case, the so-called roundabout view, a solid image or vision similar to a wedding cake is obtained. My invention can further be modified by concentric beamings, which consist of rings or circles of illumination of increasing diameters cast by a spotlight with ring-form slot or iris diaphragm held in the position of the camera. In this way, a number of ring or disc beams will hit the contour surfaces of the subject at different depths to form a pyramid style of solid image or solid vision. Whatever method of narrow beaming is adopted for a given subject, it must be emphasized that the subject must be in partial or total darkness, or, more precisely, in a place where no other actinic rays are permitted, except through the controlable slots.

It is apparent that in normal practice the axis of cameras contemplated for use usually lies in the direction of the depth, so that both the length and width of the subject at each plane of the depth may be focussed both from the front and the back of the subject. The camera may be held steadily at one viewpoint, or it may also move about within a distance, as in taking three-dimensional left-and-right eyeview pictures, or around the subject, as in radial or diagonal beamings. It is also permissible to allow the narrow beams to cast at one side of the subject when the left-eyeview composite picture is taken and then shift the narrow beams gradually to the other side when the right-eyeview picture is being made. In other words, one side of the subject is hit by the narrow beams, while the other side of the subject is in darkness. A composite picture of two-eye vision is made in this way with better three dimensional effect than when the left-to-right exposures are performed in flood-light which reaches all parts of the subject. In practice, the narrow beamer may be so attached with the camera so that with its movement along an arc the beamer traverses with it at the same speed and direction. A line or lenticular screen is usually attached to the front of a plate during exposure, or a lenticular plate is used for similar purposes.

The contour or profile images obtained in the manner described hereinabove may be printed, enlarged, reduced, projected, screened, televised, transmitted by wire or by radio, or used for engraving, etching, carving, surveying, examining, as well as for chemical machining or sculpturing of glass, metal, or any other material. When a complete series of profile or contour images are transmitted from one place to a remote distance and then assembled in the right order, we have the very means of transporting so-called image cargoes by air, which is as fast as a picture may be transmitted. Moreover, if a reel of film of such profile images is photographically printed on a multiple layer of fresh sensitive coatings (one fresh coating to be applied after each exposure) and then suitably developed and fixed, then we have a scluptural image which may be molded or cast into other materials. In fact, the profile images may also be so projected in the air that a "ghost image" similar to a column of light beams may strangely enough, come into our midst in the darkness. Such ghost image with stage appearance could possibly take the form of a web of light beams issued from a revolving projector or a number of projectors placed at different points, as long as the contours or profiles which are being projected could be intercepted in the space and then interlaced to form a weaving work of light beams.

For color photographic work, my invention is equally applicable, since each contour plane or peripherical image in color is well illuminated and may be recorded on a color plate. The summation of such colored contours will naturally look or appear in colors and the color reproduction on a solid image would be more pleasing and true to depth and tone than a flat color photograph, which is lack in colors of the unaccessible depth.

Figure 2:
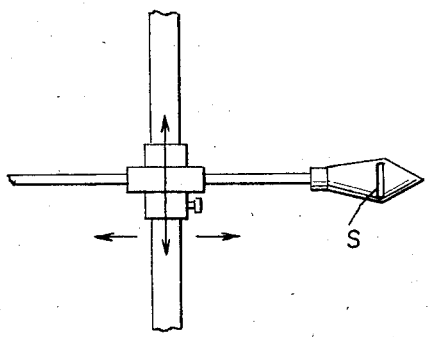
Figure 3:
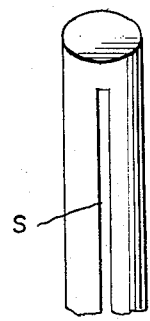
Figure 4:
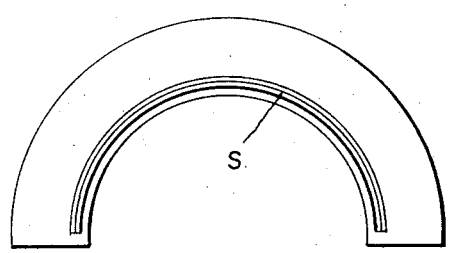
Figure 5:
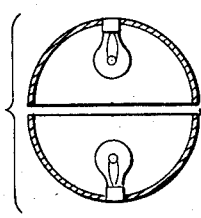
Figure 6:
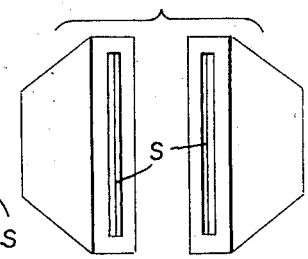
Figure 7:
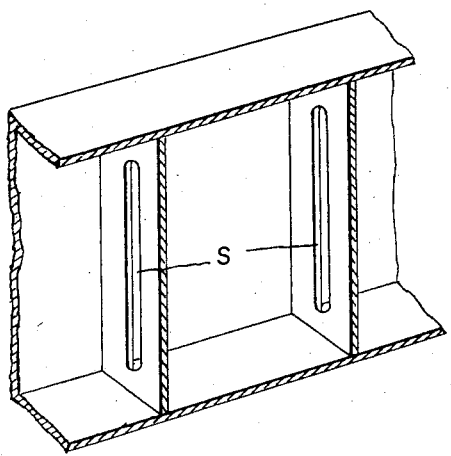
Figure 8:
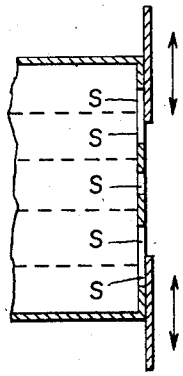
Figure 9:
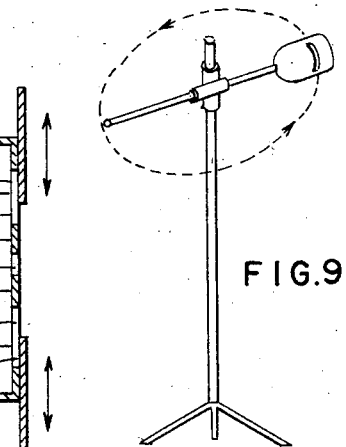

In order that the present invention may be well understood I will now describe, by way of illustrations only, some embodiments thereof with reference to the accompanying drawings, in which:

Fig. 1 to Fig. 10 are plan views showing ten arbitrary forms of narrow beamers, where $s$ denotes clear-cut slot passages for emitting light beams in a narrow sheet from a photoactinic source of light enclosed in a suitable casing or separated from the subject (not shown) by a non-permeable coating, or wall. The dip-in beamer is shown in Figs. 1 and 2, the straight and arch-formed beamers in Figs. 3 and 4, while Fig. 5 shows in section a simple make-up of narrow slot beamer with two semi-spherical reflectors, Fig. 6 shows how two dark lamp shades may be converted into narrow beamers by covering the opening part of the lamp shades with lids having a narrow slot along one diameter; Fig. 7 shows a section of a studio, of which two opposite walls are so slotted that the light from adjacent rooms may be cast on the sitter all around while he or she is slowly rotating or moving into the curtain of light beams from one end of the studio, such as from the back. Fig. 8 is a sectional view of a multiple narrow beamer, with slot openings of similar or different sizes, so that simultaneous or alternative beamings and exposures are made possible for special circumstances or effects. Fig. 9 shows a revolving or rotating narrow spot of light to generate a plane of narrow beams inwardly or outwardly, with back and forth or up and down movement, so as to generate a gradient formation of light beams along the depth of a person, object or scene. Fig. 10 shows iris or ring-form narrow beamer. It will be understood that both the intensity and distance of the light sources may be adjusted or controlled to give the desired result. Usually a pair or more of such beamers are used for our purposes.

Figs. 11 to 13 show diagrammatically how the depth or third-dimensional plane may be "multisected" or subdivided by narrow sheet beams of light rays in a parallel, radial or concentric manner. Fig. 14 shows diagrammatically how one-phase beaming is possible with the beams directed from both sides of a bust and the camera (not shown) facing the person during that phase of beaming and exposure. Fig. 15 shows diagrammatically an object being narrow-beamed by a revolving light at a certain depth. Fig. 16 shows diagrammatically an irregular object being photographed at three different points, wherein the contour images of such segmental parts have to be assembled in the proper position. Sometimes several viewpoints at different heights have to be chosen in order to obtain the best possible solid image or vision. Fig. 17 illustrates a phase of narrow beamings employing several beamers when a scene with both open spaces and solid existence is being photographed. The boundary depth is hit by the beams, which also hit the peripheral surfaces at that depth. Fig. 18 shows diagrammatically how a cavity or hollow part within a solid, which cannot be narrowly beamed from both sides of the body, is locally beamed with a dip-in beamer. This beam must be in the same plane as that of outside beamings. It may happen that the peripheral or boundary surface hit by this dip-in beamer is beyond the reach of the principal camera to record the hidden profile image, in which case another camera placed nearer to the cavity should be used to record the hidden image if it is of some importance. The profile image thus obtained on another reel of film will have to be fitted in into the principal series of profile images after development and size-adjustment, with sufficient care that they are both of the same depth. This procedure is obviously tedious, but still is a standby remedy if full details of depth are insisted upon. Fig. 19 is one illustration of assembling the final prints loosely or firmly into an album of solid image or solid vision. If the profile or contour images are printed on the above-mentioned principle of alternative coating and exposure on a single, temporary base, then the development and fixing may be so conducted that the edges of the consecutive layers of emulsion are clearly cut and streamlined to the natural appearance of the subject, following the removal of both unexposed silver and gelatine by known processes, whichever is the more practical. The unwanted marginal portions of a solid image can also be manually removed by cutting out all the constituent profiles and contours from the margins. A solid image in this form looks like a fine sculptural model, which can be felt both by the senses of touch and vision, in contrast to the flat stills or movies with optical illusion of the third dimension. Fig. 20 shows in perspective a strip of film showing profile images in succession, which may be screened with inadequate solid vision, but it is suitable for printing in series. To induce or improve the persistence of vision based on time lag, a section through a structural arrangement is given in Fig. 21, which provides both individual and summative beamings at suitable intervals with both narrow and broad beams alternatively and variably. Thus, when a subject travels in the direction of the arrow, the frontal planes are first beamed by the narrow slots $a$ and then collectively beamed by the broad slots $b$, which may vary in width, so that the contour planes which have been beamed by $a$ during the travel will be beamed jointly by $b$. In other words, each and every narrowly beamed profile image is followed by a series of broadly beamed profile images, which represents a summation of the depths previously taken by $a$. The light is alternatively switched on and off, so that when light is emitted through $a$, no light is allowed to pass through $b$, and vice versa. The width of the slot passage is controllable in order to cover the partial depth of the subject which has been covered by the narrow beams in succession. This technique aims at bridging the profile images recorded with narrow beams in such a way as will create a continuous "time lag" and promote the persistence of vision during screening. A perspective strip of film with diagrammatic alternate narrowly and accummulatively beamed contour images thereon is shown in Fig. 22. The building-up of my solid image and vision is analogous to a fish emerging out of water, when the head, the body and the tail together with the parts in-between are successively coming into our vision. Similarly, if a plastic clay is impressed with a mould or die, the impression is also a gradual process analogous to the space image being built up in accordance with my invention. The varying contours described by the boundaries between the fish and water on the one hand during the upward movement of the fish, or between the mould and clay on the other hand during the downward movement may be conceived as, and in fact comparable to, the peripheral constituent contour planes which may be rendered distinct and visible by the above described technique of peripheral narrow beaming of my invention. One feature of this technique is embodied in the ease with which it is possible to include in an ordinary movie film a short feature, such as a close-up, of solid vision, so that when the film is screened through that feature length, a vivid solid vision of an actress in truly life-like dimensions could be shown on the screen, without the aid of any optical device.

Whilst I have hereinbefore described some embodiments of the present invention I wish it to be understood that there are various possible changes or modifications which may be made without departing from the scope of my process. Thus, the number of profile or contour images is quite arbitrary and, to save materials or to produce special effect, some of the insignificant or intermeidate profile or contour planes may be discarded, or the depth of the solid image or vision may be adjusted according to one's own taste. Where the constituent images are recorded on a lenticular plate used in the new technique of so-called multiple-frame photography, the solid vision or image has to be created in the manner pertaining thereto, as far as the separation of the images for printing, enlarging, projecting, screening or televising is concerned. It is also quite apparent that the narrow beams of suitable width may be produced indirectly by means of a mirror, prism, lens, or other optical device. For special effects, the narrow beams may be of different colors, or the cameras may be in movement. It is quite understandable that a single or a number of selected profiles, contours or segments of a subject may be recorded with this technique of peripheral narrow beaming for such special purposes as chemiacl machining of glass and the like, without the necessity of creating a solid image or vision.

I claim as my invention:

1. The process for making photographic negative records on light sensitive surfaces and using the same for the production of three dimensional positive images of an object, said process comprising sequentially illuminating successive depth forming contour peripheries of the object along the photographic axis with a narrow sheet of photo-actinic rays while varying such rays in intensity in a manner to produce a gradient change in density of the contours on the photographic negative record, photographing individually the sequential series of such contour peripheries in rapid succession and in synchronization with the movement of the sheet of light rays along the depth of the object, and using the negative records so made for photo-sculpturing, engraving, and copying without separation of the individual contour peripheries to produce a projection or solid relief image in three dimensions.

2. The process according to claim 1, wherein the sequential illumination of the contour peripheries is effected in substantially total darkness and said narrow sheets of light rays are alternated with broad sheets of light rays, with each narrowly beamed contour periphery being repeatedly successively illuminated with a broad sheet of light rays having its broadness varied so as to cover previously beamed peripheral contours, keeping the object in movement relatively to the sheets of light rays, recording the successively produced contour images on successive frames of a cine film strip and then using the photographic records by projecting the same onto a screen to obtain by persistence of vision an enhancing depth of solid vision.

3. The invention according to claim 1, wherein for color photography photo-actinic rays are in color and are varied in intensity for the production of special effects.

4. The process for making photographic negative records on light sensitive surfaces and using the same for the production of three dimensional positive images of an object, said process comprising sequentially illuminating successive depth forming contour peripheries of the object perpendicular to the photographic axis with a narrow sheet of photoactinic rays while varying such rays in intensity in a manner to produce a gradient change in density of the contours on the photographic negative record, photographing individually the sequential series of such contour peripheries in rapid succession and in synchronization with the movement of the sheet of light rays along the depth of the object, and using the negative records so made for photo-sculpturing, engraving, and copying without separation of the individual contour peripheries to produce a projection or solid relief image in three dimensions.

5. The invention according to claim 1, wherein the contour peripheries are photographed on a plate by alternatively coating the plate with a light sensitive layer and making an exposure for recording the contour peripheries.

6. The invention according to claim 1, wherein the successive individual photographs of the sequentially produced contour peripheries are made on a plate.

7. The invention according to claim 1, wherein the successive individual photographs of the sequentially produced contour peripheries are made on individual plates.

8. The invention according to claim 1, wherein the individually progressively produced records are made in transparencies and such transparencies are assembled to form a three dimensional sandwich image embodied in the successive layers of said individual records.

References Cited in the file of this patent

UNITED STATES PATENTS

| | | |
|---|---|---|
| 43,822 | Willeme | Aug. 9, 1864 |
| 1,953,299 | Grant | Apr. 3, 1934 |
| 2,015,457 | Morioka | Sept. 24, 1935 |
| 2,335,127 | Ling | Nov. 23, 1943 |
| 2,703,755 | Webb et al. | Mar. 8, 1955 |

OTHER REFERENCES

Exact Reproduction Evening Star (Washington, D.C.), Jan. 1, 1935, A–4, column 1, 2.